United States Patent [19]

Bressler

[11] 4,129,278
[45] Dec. 12, 1978

[54] TRIPOD
[75] Inventor: Peter W. Bressler, Philadelphia, Pa.
[73] Assignee: Edmund Scientific Company, Barrington, N.J.
[21] Appl. No.: 830,088
[22] Filed: Sep. 2, 1977
[51] Int. Cl.² .............................................. F16M 11/32
[52] U.S. Cl. .................................... 248/165; 248/188.7
[58] Field of Search ............... 248/460, 461, 463, 464, 248/465, 528, 529, 150, 151, 165, 166, 170, 171, 188.6, 188.7

[56] References Cited
U.S. PATENT DOCUMENTS

| 383,535 | 5/1888 | McPherson | 248/171 |
|---|---|---|---|
| 455,345 | 7/1891 | Lovejoy | 248/170 X |
| 461,755 | 10/1891 | Hayes | 248/165 |
| 1,806,074 | 5/1931 | MacGregor | 248/170 X |
| 3,313,505 | 4/1967 | Petrie | 248/165 |
| 3,779,497 | 12/1973 | Webber | 248/165 |

FOREIGN PATENT DOCUMENTS

| 37607 | 11/1886 | Fed. Rep. of Germany | 248/529 |
|---|---|---|---|
| 445793 | 6/1927 | Fed. Rep. of Germany | 248/165 |

Primary Examiner—Lawrence J. Staab
Attorney, Agent, or Firm—George A. Smith, Jr.

[57] ABSTRACT

A stable tripod for an optical telescope comprises a head having an inwardly facing circular side wall, three legs, each having a shoe located at its upper end adapted to engage and push outwardly against the circular wall and having a lower end for engaging a surface upon which the support rests, means cooperating with said legs and providing a pivot whereby motion of the lower ends of said legs in an inward direction results in outward motion of the shoes against the wall, and means for urging the lower ends of the legs inwardly in order to urge the shoes tightly against the wall.

23 Claims, 10 Drawing Figures

TRIPOD

BRIEF SUMMARY OF THE INVENTION

This invention relates to supports, and particularly to those of the type useful for supporting optical instruments such as telescopes, cameras and surveyors' transits and infantry weapons such as machine guns. More generally, the invention is useful wherever a portable, stable, multilegged support is desired.

Multilegged supports, of which the tripod is a specific example, have generally required a large number of fasteners and other parts, are generally difficult to assemble and take down, and are often unstable (i.e. wobbly) and therefore unsuitable for many applications, particularly the mounting of optical instruments and weapons.

The main objects of the invention are the provision of a simple multilegged support, reduction of cost, simplification of assembly and disassembly, the reduction of the number of parts, and at the same time the provision of a highly stable, rigid, and strong support suitable for a wide variety of applications.

As do most tripods and other multilegged supports, supports in accordance with this invention comprise a head having a plurality of legs attached thereto. The head in accordance with the invention is characterized by an inwardly facing side wall, and the legs are provided with shoes located at their upper ends, the shoes being adapted to engage and push outwardly against the inwardly facing side wall. Means are provided in cooperation with the legs to provide a pivot such that motion of the lower ends of the legs in an inward direction results in outward motion of the shoes against the inwardly facing wall. The lower ends of the legs are urged inwardly by turnbuckle or other suitable means, and the inward movement of the lower ends of the legs results in a tightening of the shoes against the inwardly facing side wall of the head.

Various other objects and advantageous details of the invention will be apparent from the following detailed description when read in conjunction with the accompanying drawings.

DETAILED DESCRIPTION

Figure 1:
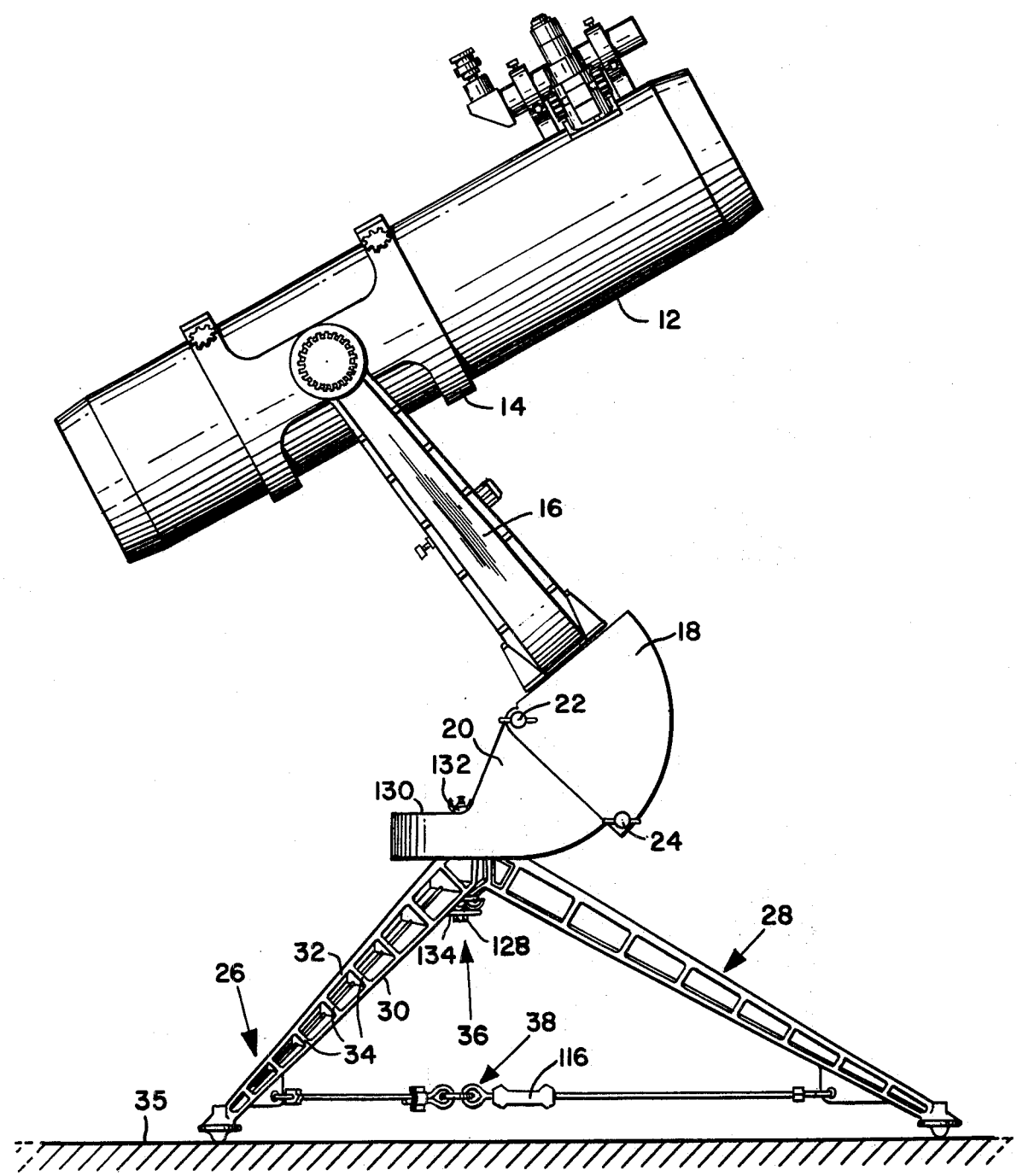
FIG. 1 is a right-hand side elevation showing a telescope mounted on a multilegged support in accordance with the invention.

In FIG. 1, an astronomical telescope barrel 12 is supported in a cradle 14, the cradle being mounted for rotation about the declination axis in yoke 16. Yoke 16 is, in turn, rotatably supported in a yoke mount 18 for rotation about the right ascension axis. The yoke mount is supported on tripod head 20, and is tiltable about an axis coincident with wing nut 22 for latitude adjustment. A second wing nut is provided at 24 for tightening of the yoke mount in fixed relationship to head 20.

Head 20 is supported on three tripod legs, two of which are indicated at 26 and 28, the third leg 27 (FIG. 7) being obscured by leg 26 in FIG. 1. The legs are preferably castings of aluminum or another suitable metal or alloy. The legs are preferably identical, and are designed for ornamental appearance, consistent with high strength and light weight. Leg 26, for example, comprises a wide lower rib 30 and a relatively narrow upper rib 32 joined by a plurality of triangular reinforcing webs 34. The lower ends of the legs rest on surface 35, and the upper ends of the legs extend into an opening in the underside of head 20 and shoes (not shown in FIG. 1) at the upper ends of the legs are forced outwardly into contact with an inwardly facing side wall in the interior of head 20 by the cooperative action of pivoting means 36 and tensioning means 38, the purpose of the latter being to urge the lower ends of the legs inwardly toward each other. The details of the pivoting means, the operation thereof, and the detailed features of the preferred embodiment of the invention are illustrated in the remaining figures.

Figure 2:
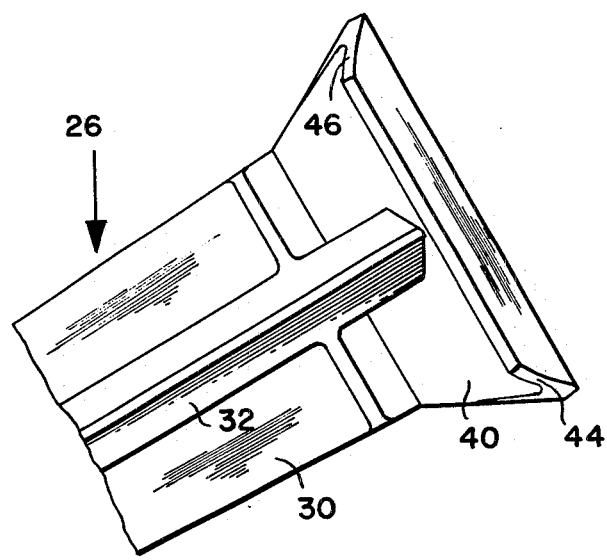
FIG. 2 is a fragmentary view showing the upper end of a leg of the support, taken through a plane located above and disposed in generally parallel relationship to the long dimension of the leg.
Figure 3:
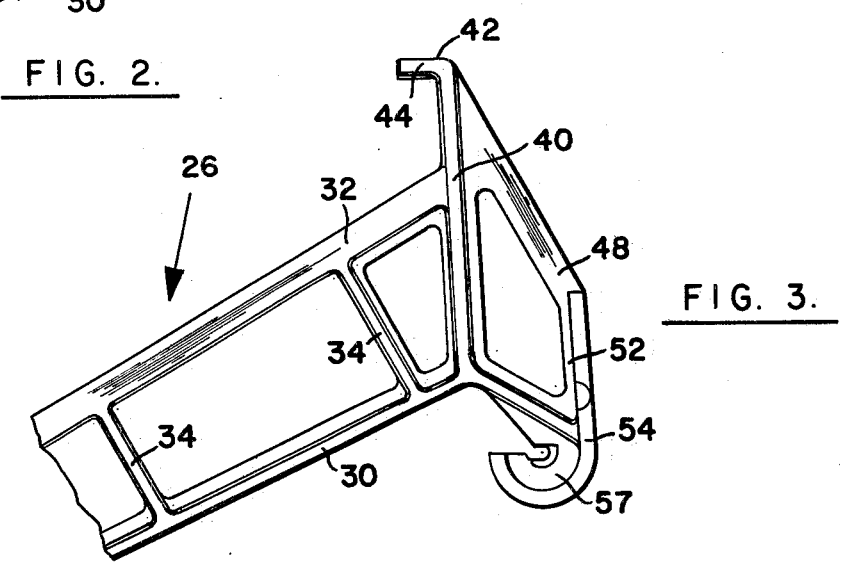
FIG. 3 is a side elevation of the upper end of the leg of FIG. 2.

FIGS. 2 and 3 show some of the important details of the construction of the upper ends of the legs. Ribs 30 and 32 terminate in a generally vertically extending plate 40 having at its upper end a shoe 42 which extends horizontally above the leg. Shoe 42 has a pair of horizontally spaced, outwardly facing surfaces 44 and 46 on its opposite sides. Surfaces 44 and 46 are preferably slightly curved and take the form of portions of an inverted cone having a very large height dimension so that they can conform to the inwardly facing surface of the head, which, as will be seen, is similarly shaped.

As shown in FIG. 3, on the opposite side of vertical plate 40, upper and lower ribs 48 and 50 extend from plate 40 to a vertically extending member 52. Vertically extending member 52 has a first contact surface 54 on one side thereof, and a similar contact surface (FIG. 9) on the opposite side thereof. These surfaces extend generally vertically along member 52, and extend in curves around a hook 57 formed in the bottom of member 52. Surfaces 54 and 56 are disposed with respect to each other at an angle of about 120°. The angle is dependent on the number of legs and is approximately 360° divided by the number of legs. For example, if the number of legs is four, the angle between the surfaces corresponding to 54 and 56 will be about 90°. If the number of legs is two, then the surfaces will be about 180° apart, i.e. parallel to each other.

Figure 4:
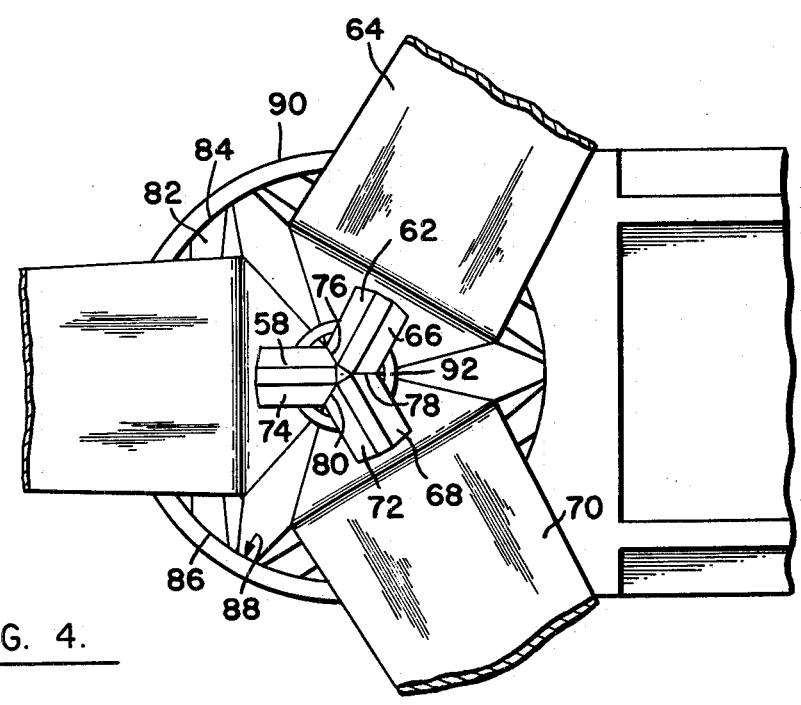
FIG. 4 is a bottom plan view showing the underside of the head of a support, and illustrating the relationship of the upper ends of the legs to the head.

Each of the two surfaces on a leg corresponding to surfaces 54 and 56 engages a surface on an adjacent leg in the manner shown in FIG. 4. Surface 58 on leg 60 engages surface 62 on leg 64; surface 66 on leg 64 engages surface 68 on leg 70; and surface 72 on leg 70 engages surface 74 on leg 60. These surfaces come into contact with each other in the curved portions thereof so that contact takes place along substantially horizontal lines 76, 78 and 80. As a result, the surfaces are in rolling engagement so that they provide a pivot whereby inward movement of the lower end of any leg causes the shoe at its upper end to move outwardly. Thus, for example, inward movement of the lower end of leg 60 causes its shoe 82 to move outwardly so that its horizontally spaced end surfaces 84 and 86 push outwardly against inwardly facing wall 88 of head 90. The shoes of the other two legs behave similarly, and when the lower ends of the legs are urged together, the shoes at their upper ends are firmly locked against the inwardly facing wall of the head. The provision of two horizontally spaced surfaces on each shoe insures that the legs become firmly locked to the head and eliminates the possibility of wobbling of the head.

Still referring to FIG. 4, a ring 92, situated in the hooks of the respective legs corresponding to hook 58 (FIG. 3), serves to prevent separation of the legs from each other in order to facilitate assembly of the support. Because of the presence of ring 92, the user does not have to pay attention to the relationship of the legs to each other while tightening tensioning means 38 (FIG. 1). The ring sustains relatively little force, however. The forces exerted by the legs act primarily on each other in directions perpendicular to lines 76, 78 and 80. When the support is assembled, each leg exerts two forces, one on each adjacent leg. The forces exerted by each leg are substantially equal in magnitude, and therefore the resultant is inwardly directed toward the axis of symmetry of the leg system. Consequently lateral components are balanced out so that there is no substantial lateral force acting on the ring.

Figure 5:
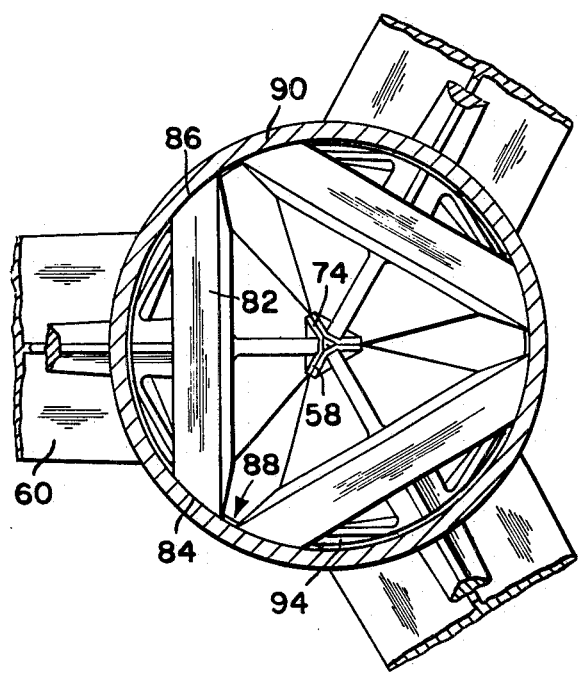
FIG. 5 is a horizontal section through a head, as viewed from above, further illustrating the relationship between the head and the upper ends of the legs.
Figure 8:
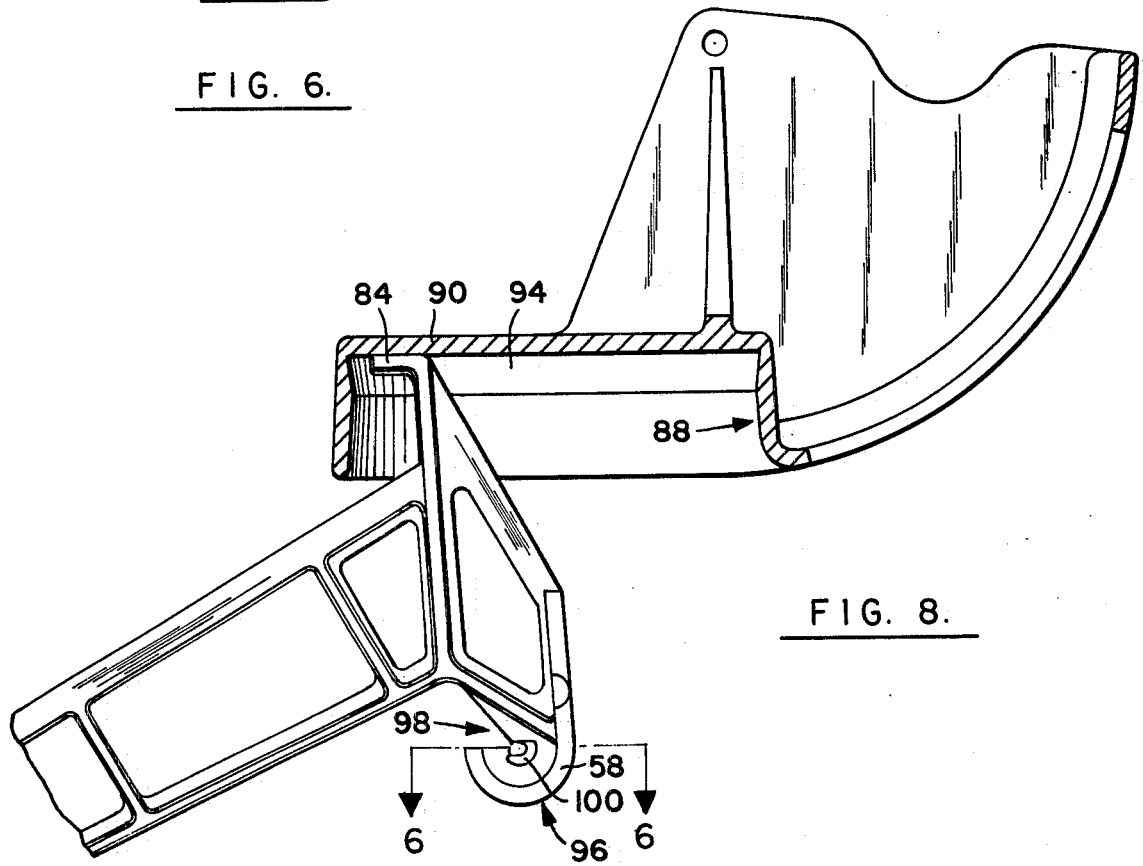
FIG. 8 is a vertical section showing the head of a support and further illustrating the relationship of one of the legs thereto.

FIGS. 5 and 8 further illustrate the cooperation of the shoes and the inwardly facing wall of the head. The inwardly facing wall 88 preferably comprises a continuous (i.e. uninterrupted) upwardly and inwardly facing sloping surface 94. The horizontal cross-sections of surface 94 are desirably circular, to permit the shoes to lock against all portions of the circumference of surface 94 in the same manner. Surface 94 is desirably substantially conical in shape, and the upwardly and inwardly facing character of the surface serves to insure retention of the head on the legs, when the shoes are tightened against surface 90. As seen in FIG. 5, the curvature of end surfaces 84 and 86, conforms to that of surface 94, all of these surfaces being substantially conical.

FIG. 5 also further illustrates how surfaces 74 and 58 engage the corresponding surfaces on the adjacent legs in rolling engagement so that inward movement of the lower ends of the legs results in a smoothly increasing locking force acting between the shoes and inwardly facing surface 94 of the head.

Figure 6:
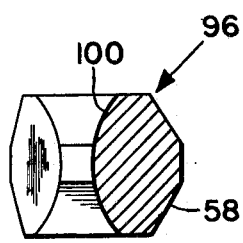
FIG. 6 is a horizontal section of a retaining hook, taken through the plane 6—6 of FIG. 8.

The configuration of the ring retaining hooks is shown in FIGS. 6 and 8, in which hook 96 is shown comprising an opening 98 and an approximately toroidal surface 100 adapted to conform to the shape of ring 92. Surface 100 is at approximately the same height as the location of the lines of contact between the surfaces. This causes the ring to be positioned substantially at the pivot location so that it is effective to hold the legs in proper relationship to each other and at the same time allows the pivoting action to take place as the lower ends of the legs are urged inwardly.

Figure 7:
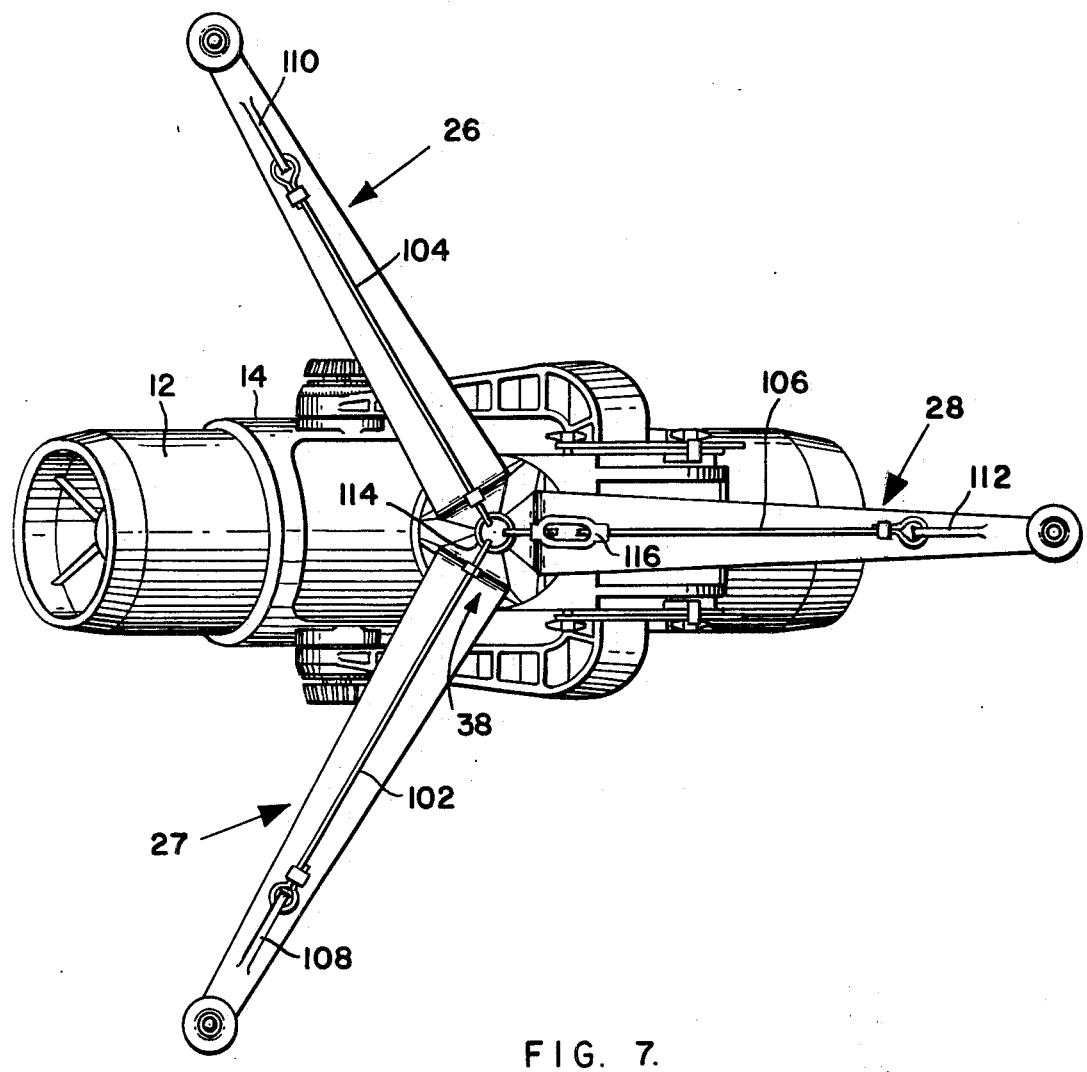
FIG. 7 is a bottom plan view of the telescope and support of FIG. 1.

In FIG. 7, the tensioning means 38 for urging the lower ends of the legs inwardly is shown as comprising three cables 102, 104 and 106. The outer ends of these cables are connected respectively to depending flanges 108, 110 and 112 near the lower ends of legs 27, 26 and 28. The inner ends of the cables are connected in common to ring 114, which is located at a central point, underneath the location of the pivot. A turnbuckle 116 is provided in cable 106, which, when tightened, serves to place all three cables in tension, whereby the lower ends of the legs are urged toward each other and the shoes are urged tightly against the inwardly facing wall of the head.

Figure 9:
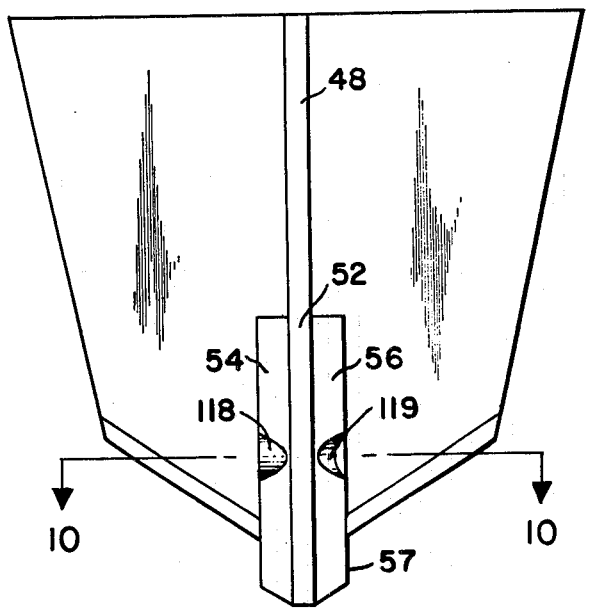
FIG. 9 is an elevational view of the upper end of a leg, as viewed from the right-hand side of FIG. 3.
Figure 10:
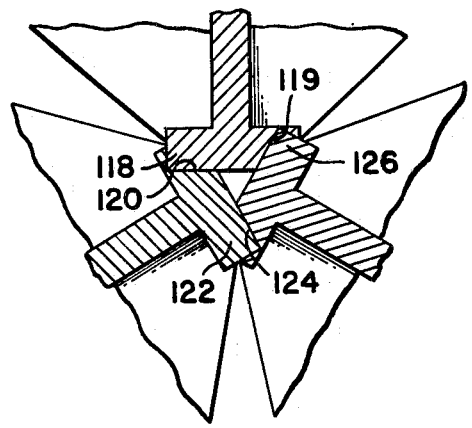
FIG. 10 is a horizontal section taken on the plane 10—10 of FIG. 9 and illustrating the cooperation of interlocking means on the plurality of legs of the support.

Another advantageous feature of the invention is illustrated in FIGS. 3, 9 and 10, which show interlocking means for preventing vertical movement of the legs relative to one another. As shown in FIGS. 3 and 9, surface 54 of member 52 is provided with a projection 118. Projection 118 is preferably in the form of a semicircular cylinder situated in such a way as to be intersected diagonally by surface 54 in the manner shown. A depression 119 is formed in surface 56. This depression is likewise in the form of a diagonally cut semicircular cylinder and is preferably shaped to conform to projection 118. As shown in FIG. 10, the projection on each leg extends into the depression on each adjacent leg. Thus, projection 118 extends into depression 120, projection 122 extends into depression 124, and projection 126 extends into depression 119, so that all three legs are locked against relative vertical movement.

In order to facilitate assembly of the support, a bolt 128 (FIG. 1) is provided, which extends vertically through the triangular space between the ring retaining hooks and through the top 130 of head 20. A wing nut 132 is used to tighten bolt 128, and washer 134 is disposed on the bolt underneath the hooks. This bolt is used to insure that the head is properly held on the tops of the legs during assembly and disassembly of the support.

The legs, the retaining ring and the cable assembly normally remain together when the support is taken down, and the lower ends of the legs can be brought together for easy transportation of the leg assembly without disturbing the retaining ring and the cable assembly.

Setting up the support simply requires the spreading of the legs, the placement of the head thereon, the tightening of wing nut 132 on bolt 128 (FIG. 1), and the tightening of turnbuckle 116. The support is taken down by reversing these steps.

The invention not only provides for rapid and easy assembly and disassembly, but also provides a highly stable, rigid and strong support, primarily by virtue of the cooperation of the shoes at the upper ends of the legs with the inwardly facing wall of the head. With the pivot means positioned near the shoes, a large mechanical advantage can be produced so that a relatively small tightening force on the turnbuckle results in very large forces acting between the shoes and the inwardly facing surface of the head. With the shoes properly locked against the inner surface of the head, substantial mechanical shocks can be applied to the assembly without changing the relationship between the head and the legs.

I claim:

1. A stable multilegged support comprising:
   a head having inwardly facing side wall means;

a plurality of legs, each leg having shoe means located at the upper end adapted to engage and push outwardly against said wall means, and having a lower end for engaging a surface upon which the support rests;

means cooperating with said legs and providing a pivot whereby motion of the lower ends of said legs in an inward direction results in outward motion of said shoe means against said wall means; and tensionable connecting means secured to the lower ends of said legs for releasably urging the lower ends of said legs inwardly in order to urge said shoe means outwardly against said wall means with a force sufficient to prevent removal of said head from said shoes;

said pivot being so located with respect to the shoes and the connecting means as to provide a mechanical advantage, whereby a relatively small tightening force in said connecting means results in large forces acting between said shoes and said wall means.

2. A support according to claim 1 in which the inwardly facing side wall means comprises an upwardly and inwardly facing sloping surface.

3. A support according to claim 1 in which the inwardly facing side wall means comprises a continuous upwardly and inwardly facing sloping surface.

4. A support according to claim 1 in which the inwardly facing side wall means comprises an inwardly facing surface having a substantially circular horizontal cross section.

5. A support according to claim 1 in which the inwardly facing side wall means comprises a substantially conical upwardly and inwardly facing sloping surface.

6. A support according to claim 1 in which the inwardly facing side wall means comprises an inwardly facing surface having a substantially circular horizontal cross section and in which the shoe means on each leg comprises two horizontally spaced side wall-engaging elements each shoe means being configured so that the areas of said side wall means located between the wall-engaging elements of said shoe means are spaced from said shoe means.

7. A support according to claim 1 in which the inwardly facing side wall means comprises an inwardly facing surface having a substantially circular horizontal cross section and in which the shoe means on each leg comprises two horizontally spaced side wall-engaging elements each shoe means being configured so that the areas of said side wall means located between the wall-engaging elements of said shoe means are spaced from said shoe means, each of said elements having an outwardly facing surface conforming to said inwardly facing surface and adapted to engage said inwardly facing surface over an area.

8. A support according to claim 1 in which said head has a bottom opening.

9. A support according to claim 1 in which said head has a bottom opening and in which said legs extend from said side wall means, though said bottom opening, to said surface on which the support rests.

10. A support according to claim 1 in which said means providing a pivot comprises means on each leg, at an intermediate location between the shoe means and the lower end, having a pair of surfaces each surface on a leg engaging a surface on an adjacent leg.

11. A support according to claim 1 in which said means providing a pivot comprises means on each leg, at an intermediate location between the shoe means and the lower end for exerting a force on corresponding means on each adjacent leg, the resultant of the forces exerted by each leg being inwardly directed.

12. A support according to claim 1 in which said means providing a pivot comprises means on each leg for engaging each adjacent leg.

13. A support according to claim 1 in which said means for urging the lower ends of said legs inwardly includes cable means for connecting said legs, and turnbuckle means for effecting tightening of said cable means.

14. A support according to claim 1 in which the number of said legs is three.

15. A support according to claim 1 in which the number of said legs is three and in which said means for urging the lower ends of said legs inwardly comprises three lengths of cable each being connected at one end to a central common point and at the other end to one of said legs, at least one of said cables having means for tightening said one of said cables.

16. A support according to claim 1 in which the number of said legs is three and in which said means for urging the lower ends of said legs inwardly comprises three lengths of cable each being connected at one end to a central common point and at the other end to one of said legs, at least one of said cables having a turnbuckle for tightening said one of said cables.

17. A stable multilegged support comprising:
a head having inwardly facing side wall means;
a plurality of legs, each leg having shoe means located at the upper end adapted to engage and push outwardly against said wall means, and having a lower end for engaging a surface upon which the support rests;
means cooperating with said legs and providing a pivot whereby motion of the lower ends of said legs in an inward direction results in outward motion of said shoe means against said wall means; and
means for urging the lower ends of said legs inwardly in order to urge said shoe means tightly against said wall means;
in which said means providing a pivot comprises means on each leg, at an intermediate location between the shoe means and the lower end, having a pair of surfaces each surface on a leg engaging a surface on an adjacent leg, said engaging surfaces being adapted for rolling engagement and contacting each other along substantially horizontal lines of contact.

18. A support according to claim 17 in which adjacent lines of contact are disposed with respect to each other at angles of 360° divided by the number of legs.

19. A support according to claim 17 in which adjacent lines of contact are disposed with respect to each other at angles of 360° divided by the number of legs, one surface of the pair of surfaces on each leg having a projection and the other surface of the pair of surfaces having a depression, the projection on each leg extending into the depression on an adjacent leg, whereby said legs are locked against vertical movement relative to one another.

20. A stable multilegged support comprising:
a head having inwardly facing side wall means;
a plurality of legs, each leg having shoe means located at the upper end adapted to engage and push outwardly against said wall means, and having a lower end for engaging a surface upon which the support rests;

means cooperating with said legs and providing a pivot whereby motion of the lower ends of said legs in an inward direction results in outward motion of said shoe means against said wall means; and means for urging the lower ends of said legs inwardly in order to urge said shoe means tightly against said wall means;

in which said means providing a pivot comprises means on each leg, at an intermediate location between the shoe means and the lower end for exerting a force on corresponding means on each adjacent leg, the resultant of the forces exerted by each leg being inwardly directed, and including ring means located substantially at the location of said pivot means for preventing separation of said legs from each other.

21. A stable multilegged support comprising:

a head having inwardly facing side wall means;

a plurality of legs, each leg having shoe means located at the upper end adapted to engage and push outwardly against said wall means, and having a lower end for engaging a surface upon which the support rests;

means cooperating with said legs and providing a pivot whereby motion of the lower ends of said legs in an inward direction results in outward motion of said shoe means against said wall means; and means for urging the lower ends of said legs inwardly in order to urge said shoe means tightly against said wall means;

in which said means providing a pivot comprises means on each leg for engaging each adjacent leg, and having means depending from said head and extending underneath said means on each leg for engaging each adjacent leg and preventing separation of said legs from said head.

22. A stable multilegged support comprising:

a head having inwardly facing side wall means;

a plurality of legs, each leg having shoe means located at the upper end adapted to engage and push outwardly against said wall means, and having a lower end for engaging a surface upon which the support rests;

means cooperating with said legs and providing a pivot whereby motion of the lower ends of said legs in an inward direction results in outward motion of said shoe means against said wall means; and means for urging the lower ends of said legs inwardly in order to urge said shoe means tightly against said wall means;

in which said means providing a pivot comprises means on each leg for engaging each adjacent leg and interlocking means for preventing vertical movement of said legs relative to one another.

23. A support according to claim 22 in which said interlocking means comprises a projection and a depression on each leg, the projection on each leg extending into the depression on an adjacent leg.

* * * * *